United States Patent [19]

Okuzono et al.

[11] Patent Number: 4,740,549

[45] Date of Patent: Apr. 26, 1988

[54] INK COMPOSITION FOR WRITING BOARD

[75] Inventors: Shuichi Okuzono, Shinnanyo; Takashi Shintani, Tokuyama; Yasuhiro Sakanaka, Shinnanyo, all of Japan

[73] Assignee: Toyo Soda Manufacturing Co., Ltd., Shinnanyo, Japan

[21] Appl. No.: 883,948

[22] Filed: Jul. 10, 1986

[30] Foreign Application Priority Data

Jul. 16, 1985 [JP] Japan ................................. 60-155036

[51] Int. Cl.$^4$ .......................... C08J 5/06; C09D 11/00
[52] U.S. Cl. .................................... 524/379; 524/547; 106/20; 106/22; 260/DIG. 38
[58] Field of Search ..................... 106/19, 20, 22, 32.5; 260/DIG. 38; 524/379, 547; 523/160, 161, 164

[56] References Cited

U.S. PATENT DOCUMENTS

| 4,170,669 | 10/1979 | Okada | 106/19 |
| 4,357,431 | 11/1982 | Murakami et al. | 106/32.5 |
| 4,634,606 | 1/1987 | Skogg | 106/19 |

Primary Examiner—Josephine L. Barr
Attorney, Agent, or Firm—Cushman, Darby & Cushman

[57] ABSTRACT

Disclosed is a wipe-erasable ink composition for a writing board, which has good erasability and long-period stability. This ink composition comprises a colored polymer formed by dyeing an organic solvent-soluble resin having a sulfonic acid group or a salt thereof with a basic dye, a volatile organic solvent and, as additives, (A) a nonionic surface active agent having an HLB value of 8 to 14 and/or a cationic organic compound, and (B) a slightly volatile or nonvolatile organic compound.

3 Claims, No Drawings

INK COMPOSITION FOR WRITING BOARD

BACKGROUND OF THE INVENTION (1) Field of the Invention

The present invention relates to an ink composition for a writing board. More particularly, it relates to an ink composition for a writing board, which has such a property that characters or marks written on a writing board incapable of absorbing the ink therein can be easily erased by lightly wiping the writing board with a cloth or paper.

(2) Description of the Related Art

A conventional wipe-erasable ink for a writing board is a dispersion or solution of a colorant such as a pigment or dye, a resin binder and an additive for manifesting erasability in an organic solvent. When a pigment is used, the ink is little absorbed on the writing board and the erasability is good. However, the dispersibility of the pigment tends to be non-uniform, the stability of the dispersion is poor, and the flowability of the ink through the pen-tip decreases during storage and the writing becomes faint. Namely, the ink has a poor long-period stability. When a dye is used, the stability during the storage is satisfactory, but if writing is allowed to stand for a long time without wiping, the ink is absorbed on the writing board and it is difficult to completely erase the writing by wiping.

SUMMARY OF THE INVENTION

It is a primary object of the present invention to provide an ink for a writing board, which has an excellent erasability and long-period stability.

In accordance with the present invention, there is provided an ink composition for a writing board, which comprises a colored polymer formed by dyeing an organic solvent-soluble resin having a sulfonic acid group or a salt thereof with a basic dye, an organic solvent, (A) a nonionic surface active agent having an HLB value of 8 to 14 and/or a cationic organic compound and (B) a slightly volatile or nonvolatile organic compound.

DESCRIPTION OF THE PREFERRED EMBODIMENTS

The organic solvent-soluble resin having a sulfonic acid group or a salt thereof, as used in the present invention, can be prepared according to various methods. For example, this resin can be obtained by a method in which a well-known ordinary resin is sulfonated or a method in which at least one ethylenically unsaturated sulfonic acid or its salt is copolymerized with at least one copolymerizable monomer. As the ethylenically unsaturated sulfonic acid or its salt, there can be mentioned unsaturated sulfonic acids such as styrene-sulfonic acid, vinylbenzylsulfonic acid, vinylsulfonic acid, allylsulfonic acid, methallylsulfonic acid, acryloyloxyethylsulfonic acid, methacryloyloxy-propylsulfonic acid and 2-acrylamido-2-methylpropane-sulfonic acid, and salts thereof such as lithium, sodium, potassium and ammonium salts.

As the copolymerizable monomer, there can be mentioned, for example, acrylic acid esters such as methyl acrylate, ethyl acrylate, propyl acrylate, butyl acrylate, 2-ethylhexyl acrylate, dodecyl acrylate, 2-hydroxyethyl acrylate and glycidyl acrylate; methacrylic acid esters such as methyl methacrylate, ethyl methacrylate, propyl methacrylate, butyl methacrylate, 2-ethylhexyl methacrylate, dodecyl methacrylate, 2-hydroxyethyl methacrylate and glycidyl methacrylate; vinyl esters such as vinyl acetate and vinyl propionate; and styrene, butadiene, chloroprene and vinyl chloride. In the copolymer used in the present invention, the copolymerization ratio of the ethylenically unsaturated sulfonic acid or its salt is not particularly limited. However, if the ratio of the ethylenically unsaturated sulfonic acid or its salt is too high, the solubility in the organic solvent is reduced. In order to obtain a colorant having a dense color, the ratio of units derived from the ethylenically unsaturated sulfonic acid or its salt in the copolymer is in the range of 0.1 to 60% by weight, preferably 0.1 to 40% by weight. This ratio is preferably such that the glass transition temperature of the copolymer is $-20°$ to $150°$ C., especially $0°$ to $120°$ C. If the glass transition temperature of the copolymer is lower than $-20°$ C., characters or marks written on a writing board become sticky, the film strength is low, and a satisfactory erasability cannot be attained. If the glass transition temperature is higher than $150°$ C., writing is not formed as a uniform film and the graphic property is not satisfactory.

The copolymer can be obtained by polymerizing the above-mentioned monomers in an organic solvent in the presence or absence of a basic dye by introducing these components collectively, intermittently or continuously into a polymerization reactor, while stirring, together with an ordinary radical polymerization initiator, for example, a persulfate such as potassium persulfate or ammonium persulfate, an organic peroxide such as cumene hydroperoxide or t-butyl hydroperoxide or an azo compound such as azobisisobutyronitrile or azobisdimethylvaleronitrile.

The polymerization temperature is not particularly critical, so long as it is lower than the boiling point of the medium. The molecular weight of the polymer obtained according to the above-mentioned method depends on the concentrations of the monomers present in the polymerization system, the amount of the radical polymerization initiator used, the polymerization temperature and the like. The monomer concentration is not particularly limited, but is generally 3 to 50% by weight, preferably 10 to 30% by weight.

If the polymerization is carried out at a high monomer concentration, the viscosity of the polymerization system is increased and removal of the polymerization heat becomes difficult. Accordingly, a high monomer concentration is not preferred. From the economical viewpoint, a too low monomer concentration also is not preferred.

As is apparent from the intended object of the present invention, the present invention is not in any way restricted by the polymer-preparing method. If the polymerization is carried out in the absence of a basic dye, the polymer obtained by the polymerization is then dyed with a basic dye. As the basic dye (in the instant specification, the term has a broad meaning, such as including a cationic dye), there can be used ordinary triphenylmethane dyes, azo dyes, methine dyes, oxadine dyes and anthraquinone dyes. Dyeing can be accomplished according to an ordinary method. More specifically, the pH value of the polymer solution obtained by the polymerization is preferably adjusted to 2 to 7, especially 3 to 5, and the dye is then added to the polymer solution.

Where the polymerization is carried out in the presence of a basic dye to obtain a colored polymer solution, in view of the stability against discoloration or color fading, the pH value of the polymerization system is preferably adjusted to 2 to 7, especially 3 to 5.

At any rate, in view of the purport of the present invention, the present invention is not limited by the dyeing conditions when dyeing the polymer of the present invention with a basic dye.

The concentration of the thus-prepared colored polymer is not particularly critical, but the colored polymer concentration is generally adjusted to 1 to 30% by weight, preferably 3 to 20% by weight, in the ink composition. If the concentration is too high, the viscosity of the solution becomes too high, and too high a colored polymer concentration is not preferred from the practical viewpoint. Too low a colored polymer concentration is not preferred, as the color density becomes low.

As the volatile organic solvent for dissolving the colored polymer in the present invention, any of organic solvents customarily used for marking pen ink compositions can be used. For example, there can be mentioned alcohols such as ethyl alcohol, n-propyl alcohol, isopropyl alcohol, n-butyl alcohol, sec-butyl alcohol, tert-butyl alcohol, isobutyl alcohol, ethylene glycol, ethylene glycol monoethyl ether and ethylene glycol monoisopropyl ether; esters such as n-butyl acetate, ethyl acetate and butyl propionate; ketones such as methyl ethyl ketone, methyl isobutyl ketone and diisobutyl ketone; and aromatic solvents such as xylene and toluene. When a solvent other than alcohol is used, in order to increase the colored polymer-dissolving power, it is preferred that the solvent be used in the state mixed with an alcohol solvent or a polar solvent such as N-methyl-2-pyrrolidone or $\gamma$-butyrolactone. The solvent is used in an amount of 50 to 96% by weight based on the ink composition. If the amount of the solvent is outside the above-mentioned range, an appropriate viscosity cannot be given to the ink composition.

Of the above-mentioned volatile organic solvents, those other than alcohol are not ordinarily preferred because of the smell or toxicity thereof, and alcohol solvents having a higher safety factor are preferred. In the present invention, if a colored polymer obtained by dyeing an alcohol-soluble polymer having a sulfonic acid group or a salt thereof with a basic dye is used, an ink composition for a writing board, which comprises an alcohol solvent, can be provided. This is one of the characteristic features of the present invention. The alcohol-soluble polymer having a sulfonic acid group or its salt can be prepared by a method in which a well-known alcohol-soluble resin is sulfonated or a method in which an ethylenically unsaturated sulfonic acid or a salt thereof is copolymerized with at least one monomer selected from alcohol-soluble resin-forming monomers such as hydroxyethyl acrylate, hydroxyethyl methacrylate, hydroxypropyl acrylate, hydroxypropyl methacrylate, polyethylene glycol monomethacrylate, polypropylene glycol monomethacrylate, ethyl acrylate, ethyl methacrylate, propyl acrylate, propyl methacrylate, butyl acrylate and butyl methacrylate [the former six monomers are monomers of group (a) giving a hydrophilic polymer and the latter six monomers are monomers of group (b) giving a hydrophobic polymer], if desired, together with a monomer copolymerizable therewith to an extent such that the alcohol solubility is not degraded. Where an alcohol-soluble resin-forming monomer is copolymerized with an ethylenically unsaturated sulfonic acid or a salt thereof, if a monomer mixture comprising a monomer of group (a) and a monomer of group (b) is selected, a hydrophobic property is given to the resulting alcohol-soluble resin and the hydroscopic property of the resin is controlled. Namely, a preferred ink composition in which writing is not sticky and the erasability is greatly improved can be provided. The proportion of the monomer of group (a) to the monomer of group (b) is preferably such that the proportion of units derived from the monomer of group (a) and that of units derived from the monomer of group (b) in the copolymer are up to 90% by weight and at least 10% by weight, respectively, based on the total weight of the units derived from the monomers (a) and (b).

The additives used in the present invention will now be described.

In the present invention, by incorporating, as additives, (A) a nonionic surface active agent having an HLB value of 8 to 14 and/or a cationic organic compound and (B) slightly volatile or nonvolatile organic compound, an excellent erasability can be attained. In the present invention, the additive (A) is used in an amount of 10 to 150 parts by weight, preferably 20 to 100 parts by weight, per 100 parts by weight of the colored polymer in the ink composition. The additive (B) is used in an amount of 10 to 150 parts by weight, preferably 20 to 100 parts by weight, per 100 parts by weight of the colored polymer in the ink composition. If the amounts of the additives are too small and outside the above-mentioned ranges, an excellent erasability cannot be attained. If the amounts of the additives exceed the above-mentioned range, the writing board will repel the writing. It is sufficient if one of the nonionic surface active agent and the cationic organic compound as additive (A) is used, but in the case of an enameled writing board, the erasability is further improved if both the nonionic surface active agent and the cationic organic compound are used in combination. In this case, the amount of the nonionic surface active agent is 5 to 100 parts by weight, preferably 10 to 70 parts by weight, per 100 parts by weight of the colored polymer in the ink composition and the amount of the cationic organic compound is 5 to 100 parts by weight, preferably 10 to 70 parts by weight, per 100 parts by weight of the colored polymer in the ink composition, and the sum of the amounts of the nonionic surface active agent and the cationic organic compound as the additive (A) is 10 to 150 parts by weight, preferably 20 to 100 parts by weight, per 100 parts by weight of the colored polymer in the ink composition. It is presumed that these additives form a thin film on the surface of the writing board to prevent direct contact or close adhesion of polymer to the surface of the writing board and erasure of the writing can be easily accomplished by wiping with a cloth or paper. It is considered that the erasability is further improved by the co-presence of the cationic organic compound because since the surface of an enameled writing board is deemed to be negatively charged, the cationic organic compound, which is positively charged, is readily interposed between the surface of the writing board and the polymer, and the electrostatic interaction between the surface of the writing board and the basic dye bonded to the polymer is weakened.

As the nonionic surface active agent having an HLB value of 8 to 14, as used in the present invention, there can be mentioned nonionic surface active agents having an HLB value of 8 to 14, which are selected from polyoxyethylene lauryl ether, polyoxyethylene oleyl ether, polyoxyethylene stearyl ether, polyoxyethylene nonylphenyl ether, polyoxyethylene sorbitol monostearate, polyoxyethylene sorbitol tristearate, polyoxyethylene sorbitol mono-oleate and polyoxyethylene sorbitol trioleate.

As the cationic organic compound used in the present invention, there can be mentioned cationic surface active agents such as dodecyltrimethyl ammonium chloride, hexadecyl trimetyl ammonium chloride, octadecyltrimethyl ammonium chloride, tetradecyldimethylbenzyl ammonium chloride, octadecyldimethylbenzyl ammonium chloride, alkylpicolinium chloride and distearyldimethyl ammonium chloride; salts of amines such as dodecylamine, tetradecylamine, hexadecylamine, octadecylamine, oleylamine and beef tallow alkylpropylenediamine; and alkylamine ethylene oxide derivatives such as oxyethylene dodecylamine, polyoxyethylene dodecylamine, polyoxyethylene octadecylamine, polyoxyethylene beef tallow alkylamine and polyoxyethylene beef tallow alkylpropylenediamine with inorganic or organic acids hydrochloric acid or acetic acid.

As the slightly volatile or nonvolatile organic compound used in the present invention, there can be mentioned organic compounds having a boiling point of at least 180° C. and a melting point not higher than 60° C., for example, dibasic acid esters such as dioctyl sebacate, dioctyl azelate, dioctyl adipate and dioctyl phthalate; monobasic acid esters such as butyl stearate, butyl oleate and butylepoxy stearate; and polyhydric alcohols such as 2-ethyl-2-(hydroxymethyl)-1,3-propanediol, 1,10-decane-diol and 2,3-butane-diol.

In addition to the above-mentioned additives, other wipe-erasing assistants such as anionic surface active agents, nonionic surface active agents, aqueous silicones and organic amides, and compounds customarily added to marking inks, such as antiseptic agents and perfumes, may be incorporated.

In the ink composition of the present invention, since the dye is strongly bonded to the resin acting as the binder, by wiping with a cloth or paper, the dye can be easily released from the surface of the writing board together with the resin as the binder. Furthermore, the dye is not absorbed by the writing board and the dye can be easily wipe-erased even after standing for a long period. Moreover, the ink composition of the present invention does not contain particles insoluble in the solvent, such as particles of a pigment and, therefore, the ink composition is a homogeneous solution. Accordingly, the ink composition has an excellent long-period storage stability. Therefore, according to the present invention, there is provided an ink composition for a writing board in which the problems of unsatisfactory erasability and poor long-period stability, involved in the conventional techniques, can be solved.

The present invention will now be described in detail with reference to the following examples that by no means limit the scope of the invention.

PRODUCTION EXAMPLES (Preparation of colored polymer solutions)

In a nitrogen current, a polymerization reactor was charged with 30 g of ethyl alcohol and the temperature was elevated to 75° C. with stirring, and a monomer solution having a composition described below and a catalyst solution formed by dissolving 0.7 g of azobisisobutyronitrile in 60 g of ethyl alcohol were added dropwise over a period of 3 hours to effect polymerization. Then, the polymerization was conducted at 75° C. for 2 hours to obtain an ethyl alcohol solution of a polymer having a sulfonic acid group. To this solution was added 52.7 g of an ethyl alcohol solution containing 5% by weight of sodium hydroxide to adjust the pH value to 6.5, and 130 g of a cationic dye (Catilon Blue CD-FRLH supplied by Hodogaya Chemical Co.) was added to the solution. The mixture was then stirred at 70° C. for 1 hour and cooled to room temperature. The solution was diluted with ethyl alcohol so that the polymer concentration was 10% by weight. The resulting dilution was filtered. Thus, colored polymer solutions of Production Examples 1 through 4 were obtained.

In 10 g of ethyl alcohol and 80 g of ethyl acetate was dissolved 10 g of a colored polymer obtained by drying the colored polymer solution obtained in Production Example 1 to obtain a colored polymer solution of Production Example 5 having a polymer concentration of 10% by weight.

The compositions of the monomer solutions used in Production Examples 1 through 4 were as follows.

| Production Example 1: | |
|---|---|
| 2-Hydroxyethyl methacrylate | 56.3 g |
| Butyl methacrylate | 23.7 g |
| Spinomer Nass (sodium p-styrene-sulfonate supplied by Toyo Soda Mfg. Co., purity = 81.9%) | 16.6 g |
| Ethyl alcohol | 140.0 g |
| Water | 90.0 g |
| Production Example 2: | |
| 2-Hydroxyethyl methacrylate | 78.0 g |
| Spinomer Nass | 16.6 g |
| Ethyl alcohol | 140.0 g |
| Water | 90.0 g |
| Production Example 3: | |
| 2-Hydroxypropyl methacrylate | 62.4 g |
| Ethyl methacrylate | 19.0 g |
| 2-Acrylamido-2-methylpropane-sulfonic acid | 13.7 g |
| Ethyl alcohol | 130.0 g |
| Water | 5.0 g |
| Production Example 4: | |
| Ethyl methacrylate | 41.7 g |
| Methyl methacrylate | 23.4 g |
| 2-Acrylamido-2-methylpropanesulfonic acid | 13.7 g |
| Ethyl alcohol | 130.0 g |
| Water | 3.0 g |

The compositions of the copolymers obtained in Production Examples 1 through 4 were as follows.

| Production Example 1: | |
|---|---|
| 2-Hydroxyethyl methacrylate | 60% by weight |
| Butyl methacrylate | 25% by weight |
| Sodium p-styrene-sulfonate | 15% by weight |
| Production Example 2: | |
| 2-Hydroxyethyl methacrylate | 85% by weight |
| Sodium p-styrene-sulfonate | 15% by weight |
| Production Example 3: | |
| 2-Hydroxypropyl methacrylate | 65% by weight |
| Ethyl methacrylate | 20% by weight |
| 2-Acrylamido-2-methylpropane-sulfonic acid | 15% by weight |
| Production Example 4: | |
| Ethyl methacrylate | 53% by weight |
| Methyl methacrylate | 30% by weight |
| 2-Acrylamido-2-methylpropanesulfonic acid | 17% by weight |

EXAMPLES AND COMPARATIVE EXAMPLES

Additives shown in Table 1 (each numerical value indicates the amount added in parts by weight) were added to 100 parts by weight of each of the colored polymer solutions of Production Examples 1 through 5, and the obtained solution was filled in a marking pen. Writing was effected on a commercially available enameled writing board and the erasability test was carried out at a temperature of 23° C. and a relative humidity of 55% by using a commercially available eraser. The obtained results are shown in Table 1, in which mark "A" indicates that writing was erased by light rubbing, mark "B" indicates that writing was erased by slightly strong rubbing, mark "C" indicates that writing was erased by considerably strong rubbing and mark "D" indicates that writing was difficult to erase.

For comparison, compositions which did not contain additive (C) [Comparative Examples 1, 2 and 3] and which contained neither additive (A) nor additive (B) [Comparative Example 4], and compositions prepared by mixing an alcohol-soluble resin with a dye [Comparative Examples 5 and 6] were similarly tested. More specifically, in Comparative Examples 5 and 6, 10 g of a butyral resin (Denka Butyral 2000-L supplied by Denki Kagaku Kogyo K.K.) or a ketone resin (Hilac 110H supplied by Hitachi Chemical Co.) and 1 g of a basic dye (Methylene Blue supplied by Hodogaya Chemical Co.) were dissolved in 89 g of ethyl alcohol, and additives shown in Table 2 were added. The erasability was evaluated in the same manner as described above. The results are shown in Table 2.

As is apparent from the results shown in Tables 1 and 2, the ink compositions for a writing board according to the present invention had a good erasability.

Additives shown in Table 1 and 2 are as follows.

Emulgen 108: polyoxyethylene lauryl ether supplied by Kao Corp. (HLB=12.1)
Emulgen 408: polyoxyethylene oleyl ether supplied by Kao Corp. (HLB=10.0)
Rheodol TWS-320: polyoxyethylene sorbitol tristearate supplied by Kao Corp. (HLB =10.5)
Catiogen L: alkyltrimethylammonium chloride supplied by Daiichi Kogyo Seiyaku K.K.
Catiogen H: alkylpicolinium chloride supplied by Daiichi Kogyo Seiyaku K.K.
Nimeen L-208: polyoxyethylene dodecylamine supplied by Nippon Oil and Fats Co.
Emulgen 935: polyoxyethylene nonylphenyl ether supplied by Kao Corp. (HLB=17.5)

TABLE 1

| Colored polymer solution | Example 1 Production Example 1 | | Example 2 Production Example 1 | | Example 3 Production Example 1 | | Example 4 Production Example 2 | | Example 5 Production Example 3 | | Example 6 Production Example 3 | | Example 7 Production Example 4 | | Example 8 Production Example 5 | |
|---|---|---|---|---|---|---|---|---|---|---|---|---|---|---|---|---|
| Additive (A), nonionic surface active agent HLB = 8-14 | Emulgen 108 | 4 | Not added | 0 | Emulgen 108 | 3 | Emulgen 108 | 3 | Rheodol TWS-320 | 3 | Emulgen 408 | 3 | Emulgen 408 | 2 | Rheodol TWS-320 | 2 |
| Additive (A), cationic organic compound | Not added | 0 | Catiogen H | 6 | Catiogen H | 5 | Catiogen H | 5 | Catiogen L | 5 | Nimeen L-208 hydrochloride | 3 | Octylamine hydrochloride | 3 | Catiogen H | 5 |
| Additive (B), slightly volatile or nonvolatile organic compound | Dioctyl adipate | 4 | Dioctyl adipate | 4 | Dioctyl adipate | 4 | Dioctyl adipate | 4 | Dioctyl sebacate | 4 | Butyl stearate | 4 | Dioctyl azelate | 5 | 2,3-butanediol | |
| Erasability just after writing | B | | B | | A | | B | | A | | A | | A | | A | |
| Erasability two weeks after writing | B | | B | | A | | B | | A | | A | | A | | B | |

TABLE 2

| Colored polymer solution | Comparative Example 1 Production Example 1 | | Comparative Example 2 Production Example 1 | | Comparative Example 3 Production Example 1 | | Comparative Example 4 Production Example 1 | | Comparative Example 5 Denka Butyral 2000 L + Methylene blue | | Comparative Example 6 Hilac 110 H + Methylene blue | |
|---|---|---|---|---|---|---|---|---|---|---|---|---|
| Additive (A), nonionic surface active agent HLB = 8-14 | Emulgen 108 | 4 | Not added | 0 | Emulgen 108 | 3 | Not added | 0 | Emulgen 108 | 3 | Rheodol TWS-320 | 3 |
| Additive (A), cationic organic compound | Not added | 0 | Catiogen H | 6 | Catiogen H | 5 | Not added | 0 | Catiogen H | 5 | Catiogen H | 5 |
| Additive (B), slightly volatile or nonvolatile | Not added | 0 | Not added | 0 | Not added | 0 | Dioctyl adipate | 5 | Dioctyl adipate | 4 | Dioctyl sebacate | 4 |

TABLE 2-continued

| Colored polymer solution | Comparative Example 1 Production Example 1 | | Comparative Example 2 Production Example 1 | | Comparative Example 3 Production Example 1 | | Comparative Example 4 Production Example 1 | | Comparative Example 5 Denka Butyral 2000 L + Methylene blue | | Comparative Example 6 Hilac 110 H + Methylene blue | |
|---|---|---|---|---|---|---|---|---|---|---|---|---|
| organic compound | | | | | | | | | | | | |
| Other additive | Not added | 0 | Not added | 0 | Not added | 0 | Emulgen 935 | 3 | Not added | 0 | Not added | 0 |
| Erasability just after writing | D | | D | | C | | D | | C | | C | |
| Erasability two weeks after writing | D | | D | | C | | D | | D | | D | |

We claim:

1. A wipe-erasable ink composition for a writing board, which comprises:
   (i) 100 parts by weight of a colored polymer formed by dyeing an alcohol-soluble copolymer having a sulfonic acid group or a salt thereof with a basic dye; said copolymer comprising 0.1 to 60% by weight, based on the weight of the copolymer, of units derived from an ethylenically unsaturated sulfonic acid or a salt thereof and 40 to 99.9% by weight, based on the weight of the copolymer, of comonomer units comprising (a) not larger than 90% by weight, based on the total weight of the comonomer units, of units derived from at least one monomer selected from hydroxyethyl acrylate, hydroxyethyl methacrylate, hydroxypropyl acrylate, hydroxypropyl methacrylate, polyethylene glycol monomethacrylate and polypropylene glycol monomethacrylate and (b) at least 10% by weight, based on the total weight of the comonomer units, of units derived from at least one monomer selected from ethyl acrylate, ethyl methacrylate, propyl acrylate, propyl methacrylate, butyl acrylate and butyl methacrylate;
   (ii) 10 to 150 parts by weight of at least one additive (A) selected from the group consisting of nonionic surface active agents having an HLB value of 8 to 14 and cationic organic compounds;
   (iii) 10 to 150 parts by weight of at least one additive (B) selected from the group consisting of slightly volatile or nonvolatile organic compounds having a boiling point of at least 180° C.; and
   (iv) an alcohol in an amount such that the concentration of the sum of the colored polymer (i) and the additives (A) and (B) is in the range of 4 to 50% by weight based on the weight of the ink composition.

2. An ink composition for a writing board according to claim 1, wherein said additive (A) comprises 5 to 100 parts by weight of the nonionic surface active agent and 5 to 100 parts by weight of the cationic organic compound.

3. An ink composition for a writing board according to claim 1, wherein the glass transition temperature of the alcohol-soluble copolymer having a sulfonic acid group or a salt thereof is −20° to 150° C.

* * * * *